United States Patent [19]
Anliker et al.

[11] Patent Number: 4,989,500
[45] Date of Patent: Feb. 5, 1991

[54] CAB DUCT ARRANGMENT FOR SERVICE OF AIR FILTERS THROUGH A SINGLE ACCESS OPENING

[75] Inventors: Roger L. Anliker, Plainfield; Robert D. Doescher, Bolingbrook, both of Ill.

[73] Assignee: J. I. Case Company, Racine, Wis.

[21] Appl. No.: 463,071

[22] Filed: Jan. 10, 1990

[51] Int. Cl.⁵ .............................................. B60H 3/06
[52] U.S. Cl. ...................................................... 98/211
[58] Field of Search ........................................... 98/2.11

[56] References Cited

U.S. PATENT DOCUMENTS

| | | | |
|---|---|---|---|
| 3,868,896 | 3/1975 | Doll et al. | 98/2.11 |
| 4,344,356 | 8/1982 | Casterton et al. | 98/2.11 |
| 4,365,541 | 12/1982 | Marques et al. | 98/2.11 |
| 4,492,151 | 1/1985 | Mattei | 98/2.11 |
| 4,612,975 | 9/1986 | Ikari | 98/2.11 X |

FOREIGN PATENT DOCUMENTS 139233  8/1982  Japan .................................... 98/2.11

*Primary Examiner*—Harold Joyce
*Attorney, Agent, or Firm*—Dykema Gossett

[57] ABSTRACT

A vehicle cab duct arrangement allows an operator to gain access to two vents typically included in an air circulation system from a single opening for maintenance or replacement of filters. A fresh air vent communicates air into the housing from the outside environment and an interior vent recirculates air from the cab into the inlet plenum. Filters are received in both vents for removing impurities from the air passing into the inlet plenum. The fresh air vent has a removable grill that allows access to the filter, and the interior vent is spaced from the fresh air vent opening such that it is accessible from the opening so that the interior vent filter may also be removed for maintenance. The two vents are disposed parallel with respect to each other and the vehicle cab door, so that when the vehicle cab door is closed, air is forced inwardly through the interior vent and towards the filter on the fresh air vent to clean the filter.

6 Claims, 2 Drawing Sheets

CAB DUCT ARRANGEMENT FOR SERVICE OF AIR FILTERS THROUGH A SINGLE ACCESS OPENING

BACKGROUND OF THE INVENTION

This invention relates to air circulation systems in large construction or farm vehicles. More particularly, this invention relates to a duct arrangement that will allow access to the air filters in a vehicle air circulation system from a single access opening.

Large construction vehicles may be equipped with an air circulation system that includes an inlet plenum supplying air to the blower assembly of the air circulation system. The inlet plenum may draw air from a plurality of sources. An inlet plenum in a large vehicle may draw a portion of its air through a fresh air vent communicating with the outside environment and the remainder of its air through a vent that recirculates air from the cab.

The vents leading into the inlet plenum are typically equipped with air filters to remove impurities from the air that is being conducted to the blower assembly. It is particularly important to have a filter on the fresh air vent in construction or farm vehicles which are often operated in dusty environments such that a large amount of impurities can be expected in the air immediately outside the vehicle.

In prior art vehicles the maintenance and cleaning of these air filters has proved to be burdensome and typically required an operator to change the filters from distinct positions. In addition, the filter on the fresh air vent frequently becomes overly clogged quite quickly due to the fact that this type of vehicle is usually operated in a dusty environment.

It is therefore an object of the present invention to provide a cab duct arrangement that will allow servicing of the two air filters from a single access opening.

It is further an object of the present invention to provide a cab duct arrangement that will possess a self cleaning feature for the fresh air filter.

Moreover, is an object of the present inventin to achieve these characteristics with a cab duct arrangement that is relatively simple and inexpensive.

SUMMARY OF THE INVENTION

In accordance with the present invention, a cab duct arrangement is disclosed which allows an operator to change both of the filters typically employed with such an arrangement from a single access opening conveniently located near both of the filters. In addition, the arrangement of the filters is such that the filter mounted on the fresh air vent will be periodically exposed to a self-cleaning feature.

The cab duct arrangement of the present invention includes a vehicle housing defining a cab and having an air circulation system. The air circulation system includes a blower arrangement having an inlet plenum that communicates with the blower inlet and is defined, in part, by a console that may mount the controls of the vehicle and a floor platform that may serve as an operator's platform and receive the operator's seat for the vehicle.

A fresh air vent extends through the housing from the inlet plenum and allows air flow from outside the housing into the inlet plenum. A second or interior vent extends through the console and allows air flow from the cab into the inlet plenum. Air filters are disposed on both the fresh air and second vents and are mounted such that they may be easily removed for maintenance or replacement.

The console is defined, in part, by a wall facing inwardly to the cab and a wall forming a portion of the outside housing. The two vents are mounted in the console such that they are parallel and facing each other with the fresh air vent being mounted in the wall forming a portion of the outside housing and the interior vent being mounted in the wall facing inwardly to the cab.

A portion of the inlet plenum is formed by the floor platform which extends to a position directly vertically below the second vent. Air being sent to the blower arrangement enters the inlet plenum from the two vents and flows through the floor platform to the inlet of the blower arrangement. The fresh air vent is covered by a grill that may be opened on pivot wires to allow access to the filter. This filter is positioned just inside the access opening and is easily accessible once the grill has been pivoted open.

The interior vent is positioned in the console parallel to and directly across from the fresh air vent such that an operator has easy access to the filter on the interior vent once the filter on the fresh air vent has been removed. The two vents are aligned such that a single line could be drawn intersecting and perpendicular to both vents. An operator wishing to clean the two filters merely opens the grill on the fresh air vent, removes the filter, and can then easily reach the filter in the interior vent for maintenance or replacement of that filter.

This invention also has a self-cleaning feature for the filter mounted on the fresh air vent which is achieved by the arrangement of the two vents and the cab door. As stated above, the two vents are mounted parallel to each other in the console. The vehicle cab door is mounted at a position parallel, and aligned with, the two vents. The single line discussed above would also intersect and be perpendicular to the cab door when it is closed.

When the vehicle cab door is moved toward a closed position, a burst of air is created in the cab from the movement and passes through the interior vent as recirculating air entering the inlet plenum. This burst of air created by the cab door can be expected to have a high velocity, and continues to pass outwardly through the fresh air vent and filter. This passage of high velocity air will clear some of the impurities from the filter and the vent. Thus, the filter mounted on the fresh air vent is periodically cleaned by routine opening and closing of the vehicle cab door.

The structure of the inlet plenum is such that if facilitates this self-cleaning feature. The console is formed with an upper and a lower portion with the upper portion being reserved for receiving controls or other vehicle features. The lower portion is defined by a central wall in the approximate vertical center of the console and having a first straight portion leading directly into the fresh air vent and a second vertically upwardly ramped portion leading to the interior vent. This central wall forms a guide-like duct that will direct air from the interior vent in the direction of the fresh air vent. In normal operation, the air entering the interior vent does not have sufficient velocity to reach the first vent. However, when the vehicle cab door is closed, the air will have sufficient velocity to travel along the guide-like duct formed by the central wall and reach the fresh air vent.

DETAILED DESCRIPTION OF A PREFERRED EMBODIMENT

Figure 1:
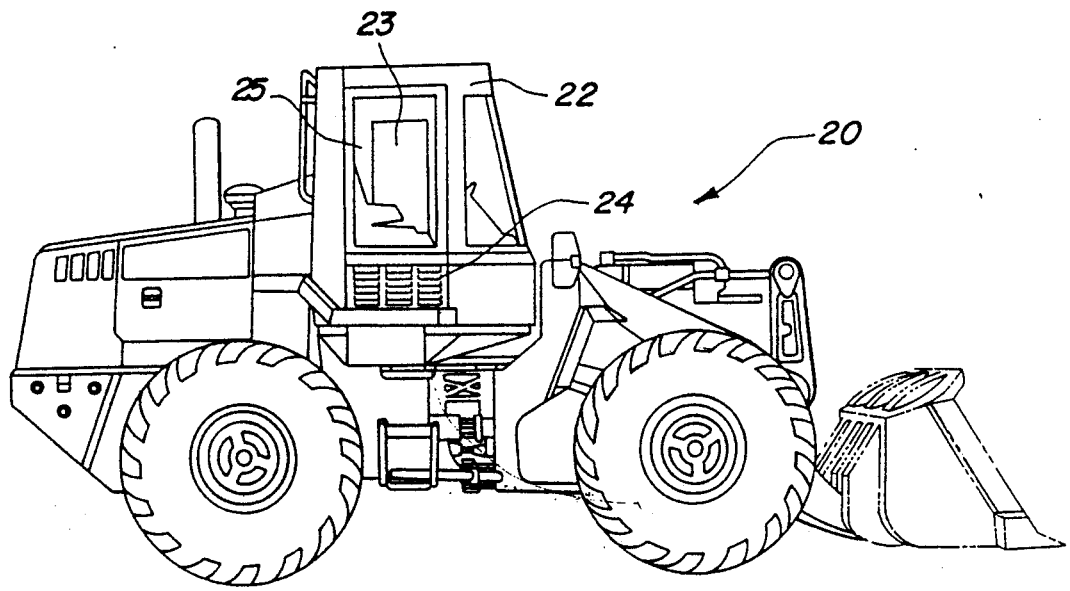
FIG. 1 is a side view showing a typical construction vehicle incorporating the cab duct arrangement of the present invention.

As shown in FIG. 1, a large construction vehicle 20 incorporates cab housing 22 defining cab interior 23. Fresh air vent 24 extends through cab housing 22 to allow air circulation from outside cab housing 22 to cab interior 23. Cab door 25 is mounted on the opposite side of cab housing 22 from fresh air vent 24 and allows an operator access to cab interior 23.

Figure 2:
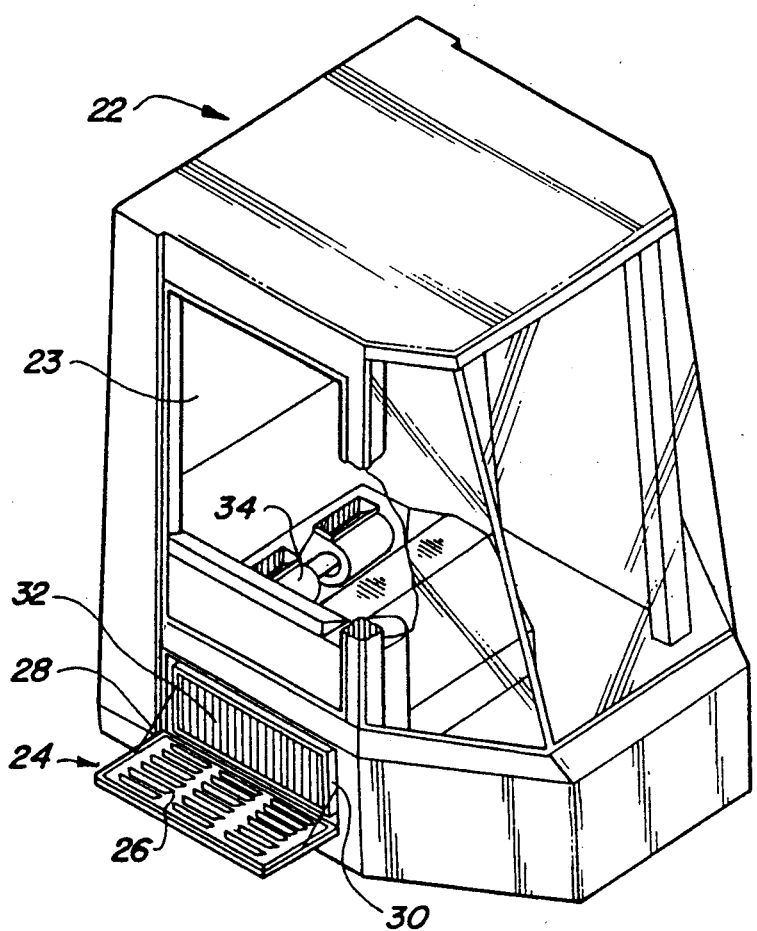
FIG. 2 is a partially cut away perspective view of a vehicle cab incorporating the cab duct arrangement of the present invention.

As shown in FIG. 2, fresh air vent 24 has grill 26 that may be pivoted open on pivot wires 28 to provide access to filter holder 30 which mounts filter 32. Fresh air vent 24 provides air for blower arrangement 34 that forms a part of an air circulation system for the vehicle cab interior 23.

It should be understood that a construction vehicle of this type is typically operated in a dusty environment. For this reason it is particularly important to have filter 32 mounted on fresh air vent 24, and it can be expected that filter 32 will become quite dirty rather quickly and may require frequent maintenance or replacement.

Figure 3:
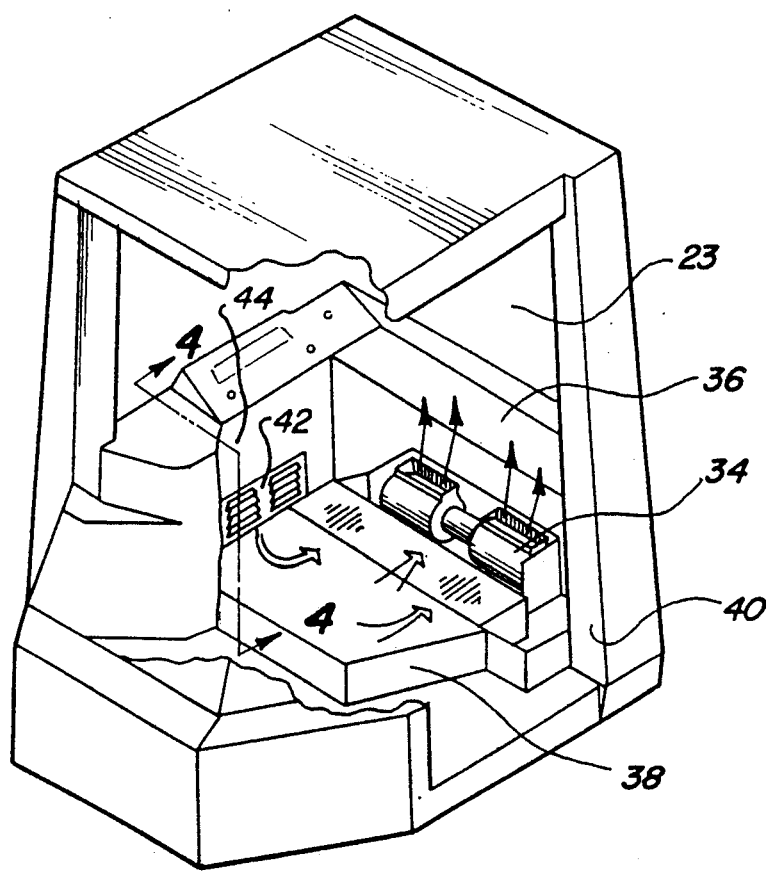
FIG. 3 is a partially cut away perspective view showing a vehicle cab incorporating the cab duct arrangement of the present invention.

As shown in FIG. 3, the blower arrangement 34 is mounted directly, vertically below a blower outlet grill 36 that delivers air into cab interior 23. Floor platform 38, that may mount an operator's seat, forms a portion of an inlet plenum providing air to the inlet of blower arrangement 34. Cab door opening 40 receives cab door 25 and is parallel and aligned with a second, or interior vent 42, which is mounted in console 44 at a vertical position directly above floor platform 38. Interior vent 42 recirculates air from cab interior 23, and in combination with fresh air vent 24, provides air to blower arrangement 34.

Figure 4:
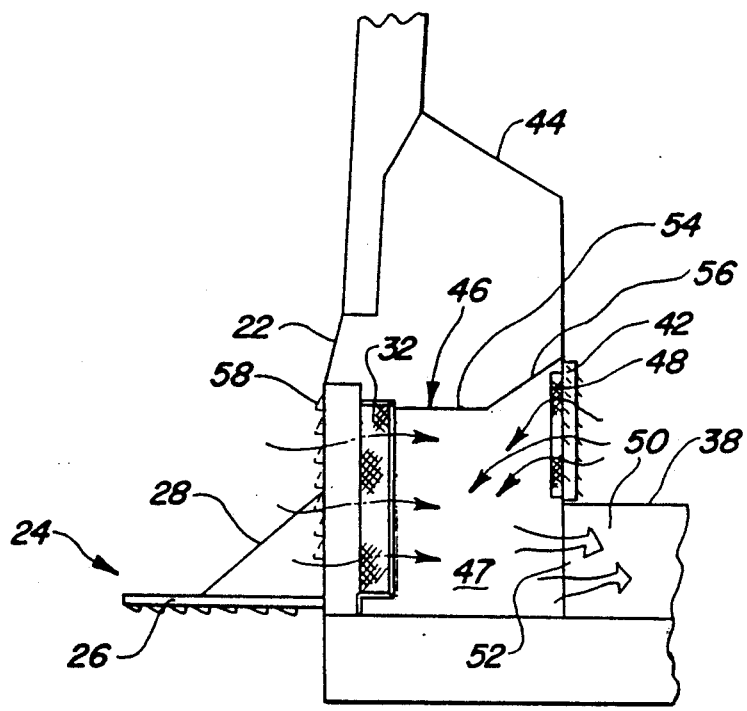
FIG. 4 is a cross-sectional view through a portion of the cab duct arrangement of the present invention.

As shown in FIG. 4, console 44 has upper and lower portions defined by central wall 46. The portion above central wall 46 may receive controls for the vehicle, and the lower portion defines inlet plenum 47 that supplies air to blower arrangement 34.

As is shown by arrows in FIG. 4, air enters both fresh air vent 24 and interior vent 42 and is intermixed in inlet plenum 47 before entering a second inlet plennum 50 through opening 52. As is most clearly shown in FIG. 3, air that enters second inlet plennum 50 communicates with blower arangement 34.

Floor platform 38 extends vertically to a position directly below interior vent 42 which is slightly vertically above fresh air vent 24. Central wall 46 has two parts, first straight portion 54 and second vertically upwardly ramped portion 56. The two part construction of central wall 46 forms a guide-like duct that leads air downwardly from interior vent 42 towards fresh air vent 24.

Fresh air vent 24, interior vent 42, and cab door opening 40 are all parallel to each other and aligned. A single line could be drawn that intersects and is perpendicular to all three.

The maintenance or replacement of filters 32 and 48 will be explained with particular reference to FIG. 4. When it is desired to replace filters 32 and 48, the operator merely pivots grill 26 from closed position 58, shown in phantom line, to an open position, which is shown in solid line in FIG. 4.

Once grill 26 has pivoted to an open position, the operator has access to filter 32 any may remove it for maintenance or replacement, leaving an access opening. Once filter 32 has been removed, the operator may easily reach through the access opening into inlet plenum 47, and remove filter 48 for maintenance or replacement.

Once the two filters have been removed the operator can either clean those filters or replace them with a new filter 48 on interior vent 42, and a new filter 32 on fresh air vent 24. With this arrangement, the maintenance of both filters 32 and 48 can be performed from a single access opening, in a relatively short period of time and in a single operation.

A self-cleaning feature for filter 32 has also been disclosed. When the operator enters cab or exit interior 23, cab door 25 is moved from an open to a closed position. When cab door 25 is opened, it is swung outwardly of cab housing 22, and when it is closed, it is swung inwardly, forcing air into cab interior 23.

This forced air is of a relatively high velocity with respect to the air normally within cab interior 23. Since interior vent 42 is aligned and parallel with cab door 25, when it is closed, a portion of this forced air enters interior vent 42. Air entering interior vent 42 will be guided along ramped portion 56 and straight portion 54 towards filter 32 mounted on fresh air vent 24.

This relatively high velocity air will pass through filter 32 in the opposite direction to the normal flow of air and will remove some impurities. By this arrangement the required period of time between replacements of filter 32 will be extended.

The filters may be felt, paper, or any other commonly known filter material. The vents preferably have louvered openings allowing adjustment of the flow into each vent.

A working embodiment of the present invention has been disclosed, however, further modifications of the invention may be made without departing from the scope and content of the invention which can be better understood when considered in light of the following claims.

I claim:

1. A cab duct arrangement comprising:
    a vehicle housing defining a cab;
    a blower arrangement having an inlet mounted within said vehicle cab;
    an inlet plenum defined in part by said housing, said inlet plenum communicating with said blower inlet;
    a first vent extending through said housing to allow air flow from outside said housing into said inlet plenum;
    said inlet plenum being further defined by a console within said cab;
    a second vent extending through said console to allow air flow from said cab into said inlet plenum;

air filters being disposed on both said first and second vents;

said first vent having a removable cover allowing access to said filter on said first vent, said filter on said second vent being positioned such that it is accessible through said first vent when said first filter has been removed.

2. A cab duct arrangement as recited in claim 1 and wherein said first and second vents are parallel to each other.

3. A cab duct arrangement comprising:

a vehicle housing defining a cab, a blower arrangement mounted in said cab and delivering air through a blower outlet grill to said cab, said blower arrangement receiving air from an inlet plenum;

said inlet plenum being partially defined by a platform in said cab;

said inlet plenum further being defined by a console in said vehicle cab, said console being defined in part by a wall facing inwardly to said cab, said console being further defined by a portion of said vehicle housing;

a first vent mounted in said portion of said housing and communicating air from outside said housing into said inlet plenum;

a second vent mounted in said wall and communicating air from inside said cab into said inlet plenum;

filters being received in both said first and second vents;

said first vent having a removable grill allowing access to said filter in said first vent, said filter in said second vent being spaced from said first vent such that is accessible from said first vent when said filter in said first vent has been removed; and a vehicle cab door having an open and a closed position and positioned outside of said wall for allowing an operator to gain access to said cab, said first vent, said second vent and said vehicle cab door being parallel to each other when said vehicle cab door is in a closed position and aligned with each other such that a single line intersects, and extends perpendicular to said first vent, said second vent and said vehicle cab door, thus facilitating cleaning of said first vent when said vehicle cab door is closed.

4. A cab duct arrangement as recited in claim 3 and wherein said console having an upper and a lower portion defined by a central wall, said lower portion defining a part of said inlet plenum, said central wall having a ramped portion extending vertically downwardly from a position near said second vent and a straight portion extending from said ramped portion toward said first vent for guiding air from said second vent toward said firt vent.

5. A cab duct arrangement as recited in claim 4 and wherein said first vent is mounted such that it has a first vertically uppermost position, said second vent being mounted such that it has a second vertically upper most position, said first vertically uppermost position being lower than said second vertically uppermost position, said floor platform being mounted vertically directly below said second vent.

6. A method of maintaining air filters in a vehicle cab air circulation system comprising the steps of:

disposing a first vent from the outside environment into an inlet plenum formed in the vehicle cab;

disposing a second vent from the vehicle cab into the same inlet plenum;

positioning the second vent such that it is accessible by an operator from the first vent;

placing filters in both of the vents;

placing a removable cover over the first vent;

opening the removable cover when it is desired to replace or perform maintenance on the filters;

removing the filter on the first vent;

reaching through the space vacated by this removed filter and removing the filter on the second vent;

replacing the filter in the second vent;

replacing the filter on the first vent.

* * * * *

UNITED STATES PATENT AND TRADEMARK OFFICE
CERTIFICATE OF CORRECTION

PATENT NO. : 4,989,500

DATED : February 5, 1991

INVENTOR(S) : Anliker et al.

It is certified that error appears in the above-identified patent and that said Letters Patent is hereby corrected as shown below:

On the title page, in item "[75]", please add the joint inventor as follows: --Alan G. Leupold, Plainfield, Illinois--.

Signed and Sealed this

Twenty-third Day of June, 1992

Attest:

DOUGLAS B. COMER

*Attesting Officer*  *Acting Commissioner of Patents and Trademarks*